United States Patent [19]

Toivonen

[11] 3,981,096
[45] Sept. 21, 1976

[54] FISHING LURE
[76] Inventor: Harry Toivonen, 1170 Ramsey View Court, Apt. 216, Sudbury, Ontario, Canada, P3E 2E4
[22] Filed: Apr. 18, 1975
[21] Appl. No.: 569,181

[30] Foreign Application Priority Data
May 2, 1974 Canada ............................. 198719

[52] U.S. Cl................................. 43/42.39; 43/42.5
[51] Int. Cl.² ........................................ A01K 85/00
[58] Field of Search........................... 43/42.39, 42.5

[56] References Cited
UNITED STATES PATENTS
1,598,958 9/1926 Crosby............................ 43/42.5 X
2,463,889 3/1949 Lundemo........................... 43/42.39
2,948,984 8/1960 Crawford........................... 43/42.39
3,881,271 5/1975 Jacura................................ 43/42.5

Primary Examiner—Louis G. Mancene
Assistant Examiner—Daniel J. Leach

[57] ABSTRACT

A fishing lure in the form of an elongate spoon-shaped body having a substantially flat intermediate portion is described. The intermediate portion extends at one end into a weighted tapered leading portion and extends at the other end into an upwardly inclined, substantially flat and relatively thin trailing portion. Each end portion is adapted to be attached to a hook or a fishing line.

7 Claims, 5 Drawing Figures

FISHING LURE

BACKGROUND OF THE INVENTION

This invention relates to a fishing lure and in particular, to a fishing lure which is particularly effective when the technique of "jigging" is used.

"Jigging" is a common term used in fishing and refers to the technique used when the fisherman is standing or sitting in a stationary position such as on the end of a wharf or on lake or river during the winter months. The fishing rod is raised a few feet with the lure remaining in the water and is then quickly dropped. Raising the rod imparts an upwards vertical motion to the lure on the end of the fishing line and dropping the rod then allows the lure to sink with a motion depending on its shape and which, it is hoped, will attract fish. Few lures have been developed specifically for jigging and they have proved to be far less effective in attracting fish than the present lure, which has been found to be highly effective in catching game fish present in Northern Ontario such as lake trout, pike, pickerel, perch and white fish.

SUMMARY OF THE INVENTION

The invention is a fishing lure in the form of an elongate body being symmetrical about the longitudinal axis of said lure, said body comprising a substantially flat trailing end, a substantially flat leading end, and a substantially flat intermediate portion, said intermediate portion smoothly tapering in decreasing width and increasing thickness from a point closer to the trailing than to the leading end of said body to a point adjacent said leading end, said trailing end being positioned at an acute angle relative to the plane of said intermediate portion and being thin relative to the thickness of said leading end, each of said ends being adapted for attachment to a hook or fishing line.

The action of the lure results from the angularly positioned trailing end portion which continues smoothly from the flat intermediate portion of the lure. The angle of this leading end determines the horizontal displacement of the lure from the vertical fishing line as it descends during jigging, and although various angles may be used, it has been found that approximately 15 degrees is most satisfactory.

The opposing or leading end of the lure is tapered and it is therefore weighted in order to provide a center of gravity to the lure, with the hook attached, approximately midway between the two ends to give a more balanced "swimming effect" when it moves through water, thereby resembling the action of live bait such as minnows.

It has further been found that reversing the lure (i.e., placing the hook on the angularly positioned end portion) and using it under trolling or casting conditions will also give effective results although the lure is primarily designed to be used with the jigging technique.

BRIEF DESCRIPTION OF DRAWINGS

In drawings which illustrate an embodiment of the invention, and which describe the invention by way of example only.

DESCRIPTION OF PREFERRED EMBODIMENTS

A fishing lure is shown generally at 1 and is in the form of an elongated spoon-shaped body having a substantially flat intermediate portion 2 between the two ends 3, 4 of the lure. The intermediate portion extends to leading end 3 in a taper having decreasing width and extends to the opposing or trailing end 4 in increasing width, but of thinner cross-section thickness relative to that of leading end 3.

Figure 2:
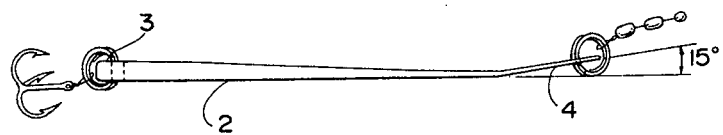
FIG. 2 is a side view of the fishing lure shown in FIG. 1.

Trailing end 4 is an angularly positioned, substantially flat surface, the plane of which continues smoothly from the plane of the intermediate portion 2, as best seen in FIG. 2. This end gives the lure its action in operation and, accordingly, the angular degree selected determines the behaviour of the lure under use. An angle of approximately 15° (FIG. 2) with that of the plane of the intermediate section has been found desirable.

To enhance the attractiveness to fish of the lure 1, a balanced "swimming effect" is achieved by providing a center of gravity 5 (FIG. 1) midway between the two ends of the lure when the hook is attached. This is accomplished by adding weight to the leading, tapered end 3 and reducing the cross-sectional thickness of the trailing end 4. Reducing the thickness of the trailing end 4 also gives the lure somewhat better and more unpredictable action due to the weight difference of the two end portions.

Figure 3:
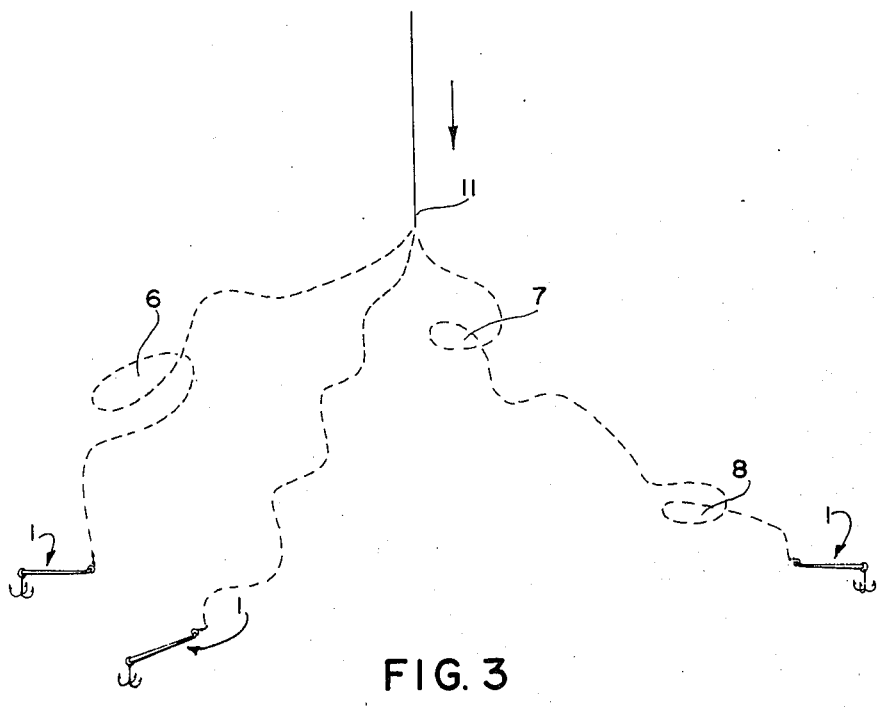
FIG. 3 shows typical trajectories of the lure under jigging action when the fishing line is lowered.

As seen in FIG. 3, the lure 1 may assume one of many trajectories, only three of which are shown. The trajectories have horizontal and vertical components of direction and may make circular directional changes as shown at 6, 7 and 8. In general, however, the trajectories are unpredictable.

Figure 1:
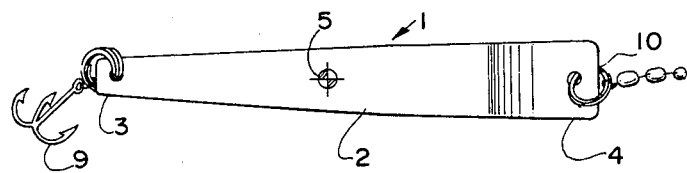
FIG. 1 is a plan view of the fishing lure.
Figure 4:
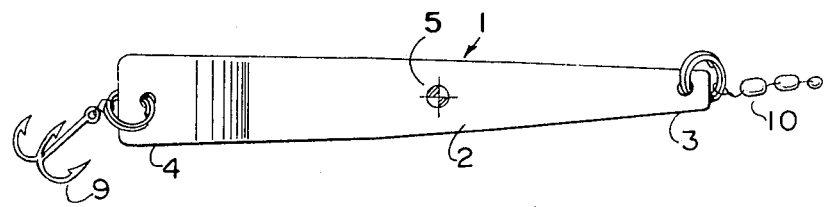
FIG. 4 shows an alternative embodiment of the fishing lure used in casting or trolling.
Figure 5:
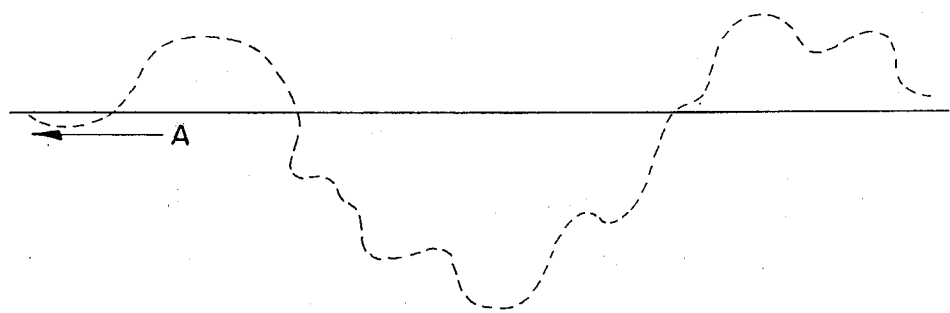
FIG. 5 shows typical trajectories of the embodiment shown in FIG. 4 under trolling or casting recovery conditions.

FIG. 4 shows an alternative embodiment of the fishing lure 1 for use in trolling or casting. Rather than attaching the hook 9 on the leading end portion 3 as shown in FIG. 1, the lure is reversed and the hook is provided at the thin, angularly positioned end portion 4 with the tapered end portion 3 being attached to a swivel 10 of the fishing line 11 (FIG. 3). Using this embodiment, FIG. 5 shows typical trajectories for the lure 1 when the tapered end portion 3 is being drawn by the line (i.e., from right to left as shown by arrow A). The inclined end portion 4 again provides the action of the lure 1 although it is somewhat more restrained due to the steady pull on the swivel 10 of the lure by the fishing line 11.

The lure is made from a suitable metallic material although a suitable heavy plastic may also be used, and may be one or a combination of several colours. Similarly, other modifications are obviously possible and the invention is not to be restricted except insofar as the limit of the appended claims.

What we claim as our invention is:
1. A fishing lure in the form of an elongate body being symmetrical about the longitudinal axis of said lure, said body comprising a substantially flat trailing end, a substantially flat leading end, and a substantially flat intermediate portion, said intermediate portion smoothly tapering in decreasing width and increasing thickness from a point closer to the trailing than to the leading end of said body to a point adjacent said leading end, said trailing end being positioned at an acute angle relative to the plane of said intermediate portion and being thin relative to the thickness of said leading end, each of said ends being adapted for attachment to a hook or fishing line.

2. A fishing lure according to claim 1 and further comprising a hook attached to the leading end of the lure.

3. A fishing lure according to claim 1 wherein the center of gravity of the lure and hook is approximately midway between the two ends.

4. A fishing lure according to claim 3 wherein the acute angle of said trailing end is approximately 15°.

5. A fishing lure according to claim 3 wherein said lure is made from a suitable metallic material.

6. A fishing lure according to claim 1 wherein said intermediate portion smoothly passes through a transitional zone into said trailing end.

7. A fishing lure according to claim 1 and further comprising a hook attached to the trailing portion of the lure.

* * * * *